United States Patent [19]

Goltsos

[11] 4,157,018
[45] Jun. 5, 1979

[54] MACHINES FOR CONVEYING ARTICLES THROUGH A HEAT TRANSFER MEDIUM

[75] Inventor: Costas E. Goltsos, Weston, Mass.
[73] Assignee: Teckton, Inc., Wellesley, Mass.
[21] Appl. No.: 794,365
[22] Filed: May 6, 1977
[51] Int. Cl.² .................... F25D 17/02; F25D 25/02
[52] U.S. Cl. ..................................... 62/373; 62/384; 62/386
[58] Field of Search ............... 62/64, 373, 384, 386, 62/382; 222/478, 482

[56] References Cited

U.S. PATENT DOCUMENTS

| 2,474,069 | 6/1949 | Silvera | 62/382 |
| 3,688,518 | 9/1972 | Goltsos | 62/63 |

*Primary Examiner*—Allen M. Ostrager
*Attorney, Agent, or Firm*—Wolf, Greenfield & Sacks

[57] ABSTRACT

A system for advancing trays of foor or other material to be frozen or heated through a vertically oriented housing is provided with improved means for loading the trays at one end of the housing, causing incremental advancement of the trays and removing them from the other end of the housing. The device includes a removal drawer at the outlet end which, when closed, supports the stack of trays in the device. When the drawer is opened, the stack advances downwardly and the lowermost tray in the stack is removed from the bottom of the stack and is drawn outwardly with the drawer. During opening of the drawer, other means are employed to support the stack of trays after the stack has moved downwardly one tray increment. When the drawer is reclosed, the trays are again supported by the drawer. A cold (or hot) medium is introduced into the housing at a plurality of levels. The internal surfaces of the housing are arranged to cooperate with the trays and coolant or heat sources so that the articles in the tray are subjected to a zigzag reversed flow of the heat transfer medium as the trays are advanced incrementally downwardly through the device.

6 Claims, 15 Drawing Figures

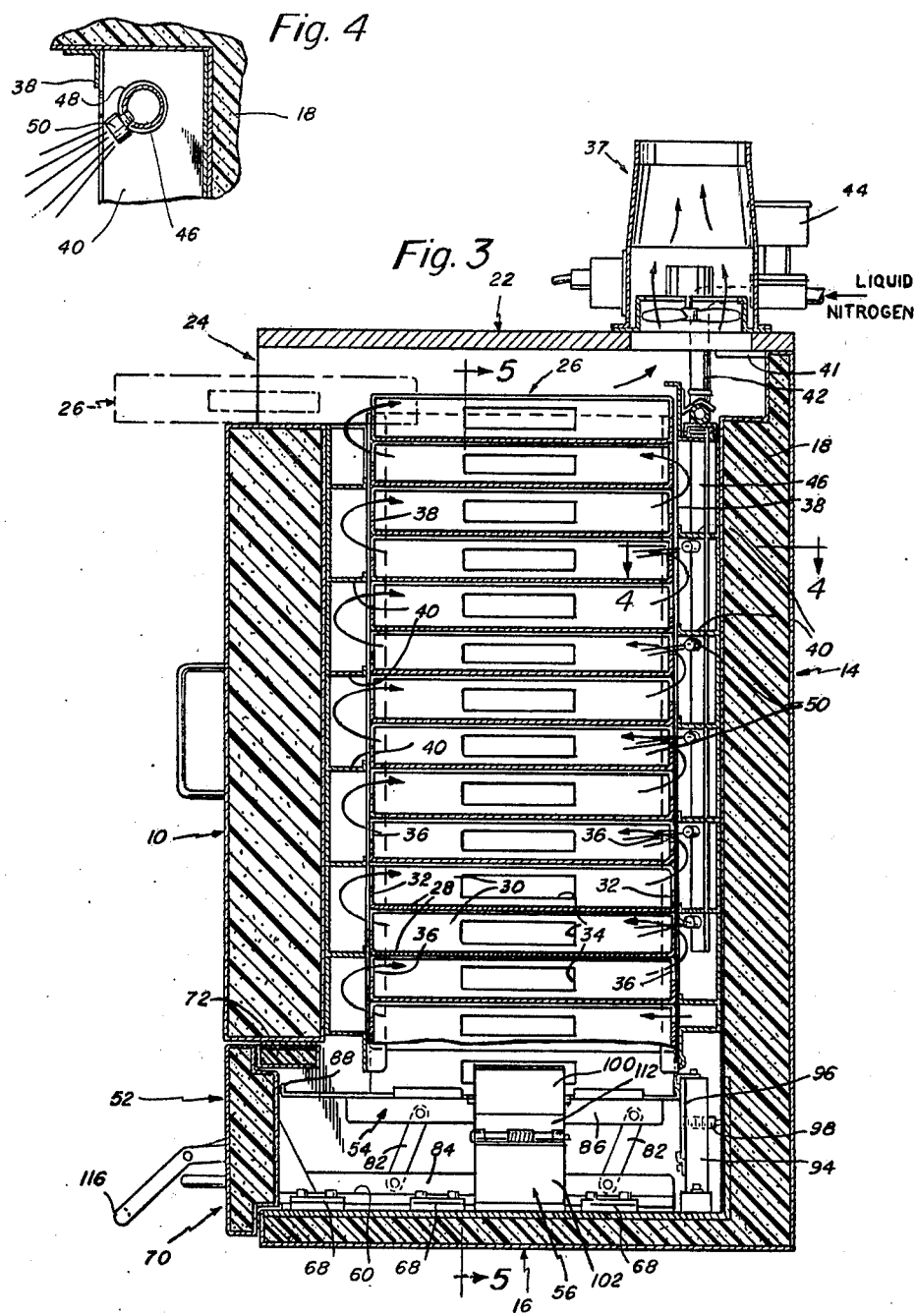

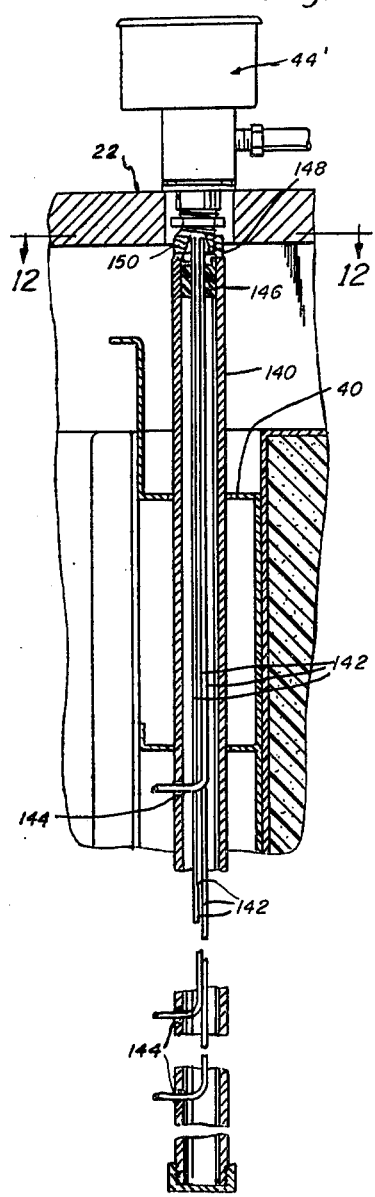
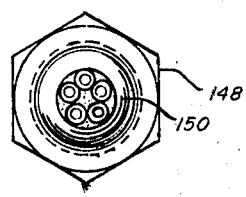
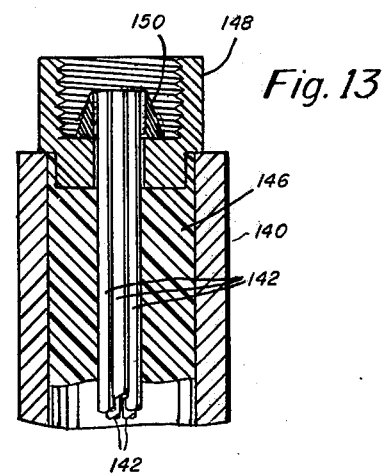
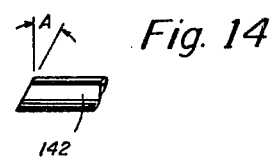

MACHINES FOR CONVEYING ARTICLES THROUGH A HEAT TRANSFER MEDIUM

BACKGROUND OF THE INVENTION

This invention relates to improvements in devices for quick freezing of articles such as food products or the like as well as to systems for heating such articles. More particularly, this invention is an improvement to the system described in my prior U.S. Pat. No. 3,688,518 issued Sept. 5, 1972 for a Refrigerated Conveyor System which discloses a device for quick-freezing of raw or cooked foods. The device includes an insulated heightwise extending freezing chimney having an inlet at its upper end and an outlet at its lower end. Trays containing the articles to be frozen are introduced into the inlet at the top of the chimney and are stacked one atop the other vertically within the chimney. The stack of trays is advanced downwardly in incremental steps by a drive mechanism. The trays are designed so that when stacked, their contained articles will be exposed to a cryogenic coolant which is sprayed across the articles in the trays. The internal surfaces of the chimney are provided with deflectors which cooperate with the stacked trays so that when the stack is advanced downwardly in incremental steps, the flow of coolant will be reversed over and in relation to each tray. Thus, the coolant flows upwardly and along a transverse zigzag path to achieve maximum cooling effect along the height of the chimney.

In the machine described in my prior patent, means are provided for automatically withdrawing the lowermost tray from the stack and for transporting that tray away from the machine. The mechanism also serves to advance the stack incrementally and automatically downwardly to its next lower incremental position in the machine. The machine described in my foregoing U.S. patent, having the automatic withdrawal and advancing apparatus may, in a number of instances, have too large a capacity for some environments. For example, in a relatively small restaurant, an automated conveyor system, because of its necessarily larger capacity, would necessarily be idle much of the time. The present invention relates to an improved system which is better suited for use in smaller environments having reduced capacity requirements.

SUMMARY OF THE INVENTION

The present invention employs an insulated, heightwise extending freezing chimney having a tray inlet at its upper end. The lower end of the device includes a drawer mechanism which, when opened, carries with it the lowermost tray in the stack to permit removal of that tray. Supplemental means are provided within the device for engaging and supporting the next lowermost tray in the stack while the lowest tray is being removed. When the drawer is returned to its closed position, a platform mechanism, carried by the drawer, raises upwardly into engagement with the lowermost tray in the stack and raises the stack very slightly but sufficiently to cause the supplemental stack supporting mechanism to release the stack so that the stack then may be supported entirely by the drawer platform. Each operation of the drawer and platform mechanism causes the entire stack to advance downwardly one tray increment to the next lowest tier. Nozzles are provided at different tier levels in the device to emit a cryogenic fluid (liquid and/or gas) and to direct the cryogenic medium between successively stacked trays to freeze the products in the tray. A blower may be provided to assist the general direction of flow in a generally upward direction in opposition to the downward direction of advancement of the trays. Baffle means are provided interiorly of the device to cooperate with the trays and cryogenic nozzles so that flow of cryogenic medium will be directed in a zigzag path and in which the flow, with respect to the materials contained in each tray, will be reversed as each tray progresses from one tier to the next. The drawer mechanism also includes specially constructed latch mechanism which assures proper operation of the device.

The invention may utilize liquid nitrogen as the cryogenic medium. However, in some instances, it may be preferable to use liquid carbon dioxide as the cryogenic medium. That, however, has heretofore presented a number of practical difficulties in the distribution of that cryogenic medium at a plurality of different locations. One of the primary difficulties is that expansion of the liquid carbon dioxide results in direct formation of the substantial quantity of solid carbon dioxide which tends to block the flow passages in the distribution system. In a further aspect of the present invention, an improved distribution system is provided in which carbon dioxide may be emitted simultaneously from a plurality of nozzles and in a manner which avoids the foregoing and other difficulties which have been heretofore presented with the use of carbon dioxide.

In a further variation of the invention, the system is used to heat the food or articles. In this embodiment, heat sources are provided at various tiers, in place of the cryogenic nozzles. The flow system is substantially closed in that there is no continuous withdrawal of heated air from the system. Rather, the flow system is arranged to recirculate the heated air and thereby maximize the efficiency of the system.

It is among the general objects of the invention to provide further improvements to systems for rapidly freezing articles with a cryogenic coolant.

A further object of the invention is to provide a device for rapidly freezing products in which the device is sufficiently small capacity as to render it economical for use in environments having reduced capacity requirements.

A further object of the invention is to provide a device for the quick freezing of foods or the like by advancing a stack of trays bearing the foods in increments to present each tray to successively different tiers and to direct the flow of coolant in a zigzag path with an improved means for withdrawing the lowermost tray from the stack.

A further object of the invention is to provide a device of the type described having a tray inlet at its upper end and a tray removal drawer at its lower end in which the removal drawer carries a means for supporting the stack of trays when the drawer is closed, in combination with supplemental stack supporting means which supports the stack of trays when the drawer is operated to remove the lowermost tray from the stack.

Another object of the invention is to provide an improved system for distributing liquid carbon dioxide at a plurality of locations at the same time while avoiding blockage of the distribution system by solidified carbon dioxide.

A further object of the invention is to provide a device of the type described which may be used to heat articles in progressive stages.

DESCRIPTION OF THE DRAWINGS

The foregoing and other objects and advantages of the invention will be appreciated more fully from the following further description thereof, with reference to the accompanying drawings wherein:

FIG. 3 is a sectional elevation of the device as seen along the line 3—3 of FIG. 1;

FIG. 4 is a sectional illustration of a nozzle for spraying liquid nitrogen into the device;

FIG. 11 is a sectional illustration of one of the distribution pipes used in the carbon dioxide system as seen along the line 11—11 of FIG. 10;

FIG. 12 is a sectional illustration of the upper end of one of the carbon dioxide distribution pipes as seen along the line 12—12 of FIG. 11;

FIG. 13 is an enlarged illustration of the upper end of the distribution pipe shown in FIG. 11;

FIG. 14 is an enlarged illustration of the outlet end of one of the carbon dioxide distribution tubes.

DESCRIPTION OF THE PREFERRED EMBODIMENT

Figure 1:
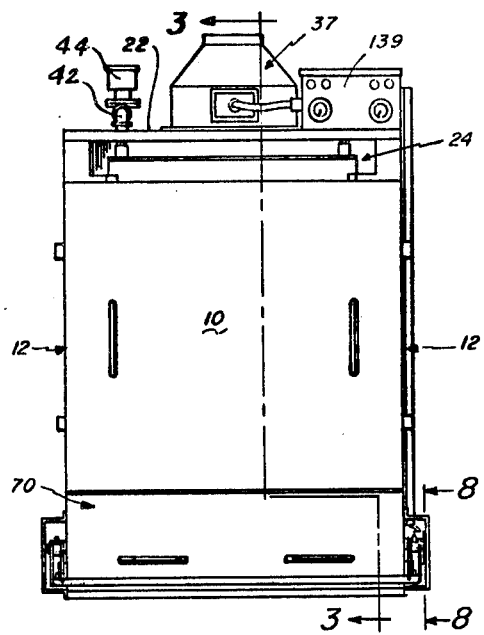
FIG. 1 is a front elevation of the device.
Figure 2:
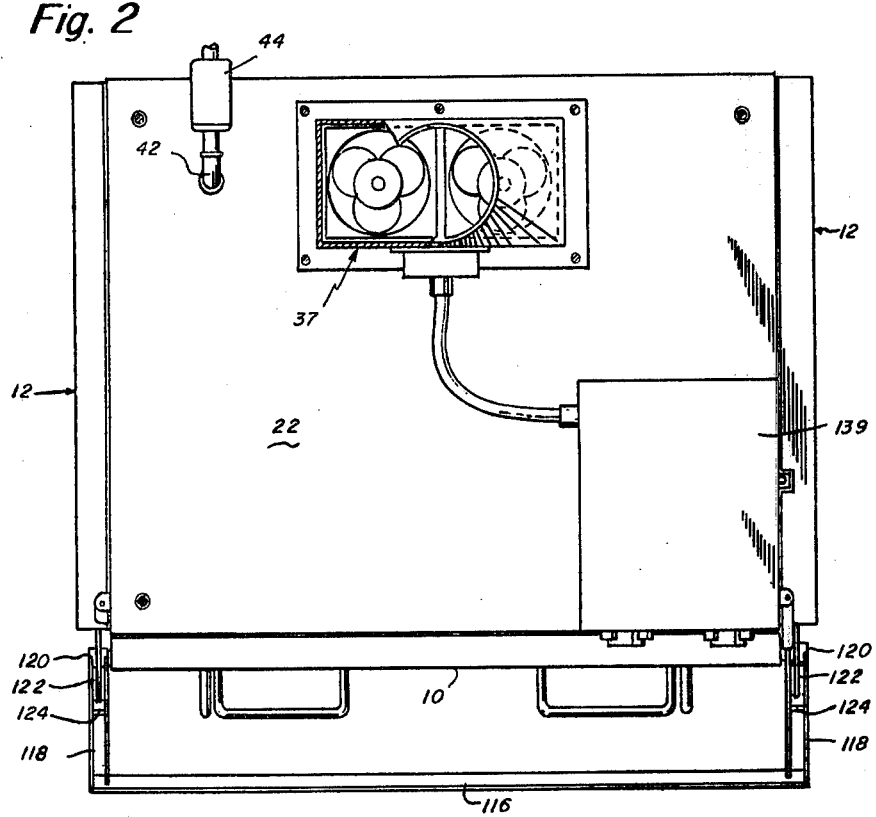
FIG. 2 is a plan view of the device.

As shown in FIGS. 1, 2 and 3, the device includes a cabinet or housing having a removable front wall 10, a pair of sidewalls 12, a rear wall 14 and a bottom wall 16. Each of the walls 10, 12, 14 and 16 is of insulative construction and may, for example, include a foamed rigid plastic core 18 surrounded by an outer metallic skin 20 such as stainless steel. The cabinet also includes a top wall 22 which is supported on top of the sidewalls 12 and rear wall 14. The upper end of the front wall 10 terminates below the level of the top wall 22 to define an inlet opening 24 at the top front of the device. The inlet opening 24 is dimensioned to permit a tray 26 to be inserted into the top of the device as suggested in phantom in FIG. 3.

The interior of the cabinet may be considered as defining a generally heightwise extending column in which the trays 26 are stacked. The trays preferably are formed from a heat conductive material and have a solid bottom wall 28 on which the food articles are supported. The trays have continuous sidewalls 30 and front and rear walls 32. The sidewalls are provided with holes 34 to provide a hand grip and also to facilitate incremental advancement of the stack of trays, as will be described. Front and rear walls 32 are of a reduced height so that when a number of such trays are stacked, forwardly-rearwardly extending passages 36 will be defined between each pair of stacked trays. As will be described more fully herein, the coolant is caused to flow through the passages 36 into communication with the food contained in each tray. The passages 36 permit the coolant to flow freely over the contained food, either forwardly or rearwardly. Continuous flow may be assisted by a blower 37 mounted to the rear of the top wall 22 of the cabinet.

The trays are maintained in a registered, stacked configuration and in vertical alignment with each other, by two pairs of vertically extending guide strips 38 which are secured to and extend inwardly from the inner surfaces of each of the cabinet sidewalls 12. The guide strips 38, in each pair, are spaced by an amount just slightly greater than the front-to-rear dimension of the trays 26 to maintain them in forward-rearward registry. The inner surfaces of the cabinet sidewalls 12 are spaced by an amount just slightly greater than the sidewall-to-sidewall width of the tray to maintain the trays in lateral registry. The guide strips 38 and inner surfaces of the sidewalls 12 cooperate to maintain the stack of trays in registry and to guide the trays downwardly in incremental steps as will be described.

The front and rear walls 10, 14 of the cabinet each are provided with inwardly facing deflectors 40 which also may be formed from stainless steel. Each adjacent pair of deflectors 40 is spaced heightwise by an amount equal to the height of two stacked trays 26. The deflectors 40 on the front wall 10 are vertically offset with respect to the deflectors 40 on the rear wall. This staggered arrangement of deflectors cooperates with the tray configuration to provide the zigzag coolant flow as will be described below. The deflectors 40 protrude inwardly so that they will be disposed in proximity to the front and rear walls 32, respectively, of the trays as the trays advance downwardly through the cabinet.

The cryogenic coolant, such as liquid nitrogen is introduced into the cabinet through an inlet pipe 42 and a thermostatically controlled valve 44 which is designed to control the admission of the liquid nitrogen into the cabinet. The liquid nitrogen is piped from the valve 44 to a pair of spray pipes 46 which are located at the rearward corners of the cabinet. Each of the spray pipes 46 extends upwardly through openings 48 formed in the rearward deflectors 40. The ends of each spray pipe 46 are closed and each pipe is provided with a series of vertically spaced nozzles 50. The nozzles 50 are designed to permit admission of a combination of liquid and gaseous nitrogen which flood the interior of the cabinet to cool that region to a significantly low temperature. The nozzles 50 are located between their associated deflectors 40 and, preferably, the nozzles 50 are staggered vertically so that there is one nozzle associated only with alternate flow passages between the trays in the stack to assist in the zigzag movement of the coolant. The nozzles 50 preferably are arranged to direct the admitted spray in a fanned configuration and in a slightly downwardly oriented angle to aim the spray more directly at the articles within the tray.

The stack of trays advances downwardly by gravity in increments equal to the height of one tray by a mechanism described below. Each time the stack advances downwardly to its next increment, or tier, the direction of flow with respect to the articles in that tray is reversed.

The mechanisms for advancing the stack of trays in increments includes a removal drawer indicated generally by the reference character 52, located at the bottom of the cabinet. The drawer 52 is supported for forward-rearward movement on the bottom wall 16 of the cabinet. The drawer 52 carries a platform 54 which, when the drawer is closed, is in a raised position to support the lowermost tray in the stack and, therefore, the entire stack. When the drawer 52 is opened (FIGS. 7 and 8) the platform 54 lowers to lower the entire stack of trays until a supplemental support mechanism, indicated generally by the reference character 56, engages the holes 34 in the sidewalls 30 of the next lowermost tray in the stack. The supplemental support mechanism 56 supports the remaining stacked trays while the drawer 52 is opened. When the drawer 52 has been opened fully, the platform 54 is in its fully lowered position and the separated tray, which was carried with the platform and drawer, can be removed. The drawer 52 then is closed (in a manner described) which causes the platform 54 to be raised into engagement with the lowermost tray in the stack. At that time, the supplemental support mechanism 56 releases and the stack again is supported entirely by the platform 54.

As shown in FIGS. 3 and 5-9, the drawer includes a flat bottom plate 58 having an upstanding wall extending peripherally about its side and rear edges. The bottom plate 58 is slideably supported for forward-rearward movement by a longitudinally extending guide 62 attached to the inner surface of the bottom wall 16 of the cabinet. The guide 62 is received in a longitudinally extending V-shaped channel 64 formed in the bottom plate 58. The bottom plate also is slideably supported on a pair of laterally spaced side rails 66 which are also secured to the bottom wall 16 of the cabinet. The slide rails 66 and guide 62 preferably are formed from a suitable plastic material having relatively low friction characteristics such as, for example, polypropylene. The removal drawer 52 is further guided for its forward-rearward movement by a plurality of drawer guides 68 located on each side of the drawer plate 58. Each of the drawer guides 68 is secured to the inner surface of the bottom wall 16 of the cabinet. The drawer guides 68 are disposed in close proximity to the sidewalls portions of the drawer plate peripheral wall 60 and at the same level as the peripheral wall 60 to further confine and guide the drawer plate 58 for movement only in a forward-rearward direction. A drawer front plate 70 is attached to the forward end of the drawer plate 58 and is of a cross sectional shape such that when the drawer is closed, the front plate 70 will fit closely into engagement with those portions of the cabinet which define the drawer opening, namely, the front edge of the bottom wall 16 of the cabinet and the front edge of a transverse bar 72. Each of the transverse bar 72 and drawer front plate 70 are of insulative construction including an inner foam plastic core surrounded by stainless steel skin.

In order to further guide and support the drawer, the device includes a pair of telescoping drawer slides indicated generally by the reference character 74. The drawer slides 74 may be selected from a wide variety of such devices which are commercially available. Each drawer slide has a stationary portion 76 which is secured to the outside of the cabinet sidewalls 12. The forwardly protruding portions 78 of the drawer slides 74 are secured to the side edges of the drawer front plate 70 as suggested at 80.

The platform 54 is mounted to the drawer plate 58 for heightwise movement as well as forward-rearward movement by two pairs of parallelogram links 82. The links 82 are pivotally attached, at their lower ends, to the drawer plate 58 by a pair of forwardly-rearwardly extending channels 84. The upper ends of the links 82 are pivotally attached to the underside of the platform 54 by a similar arrangement of a pair of U-shaped channels 86 which are secured to the underside of the platform 54 and to which the upper ends of the links 82 are pivoted. The arrangement of parallelogram links 82 serves to maintain the platform 54 in a horizontal attitude throughout its range of movement. In its lowermost position, shown in FIGS. 6-8, the platform channels 86 will rest on top of the drawer plate channels 84 with the links 82 extending in a rearwardly and slightly upwardly inclined attitude. When in this position, the platform 54 will be disposed in its most rearward and lowest position with respect to the drawer. The platform 54 is provided with front and rear peripheral walls 88, 90 as well as one or more upstanding sidewalls 92. The platform walls 88, 90, 92 and, particularly, the sidewalls 92 and rear wall 90, will engage the lowermost tray in the stack to assure that that tray will be drawn outwardly through the drawer opening when the drawer is opened.

Figure 7:
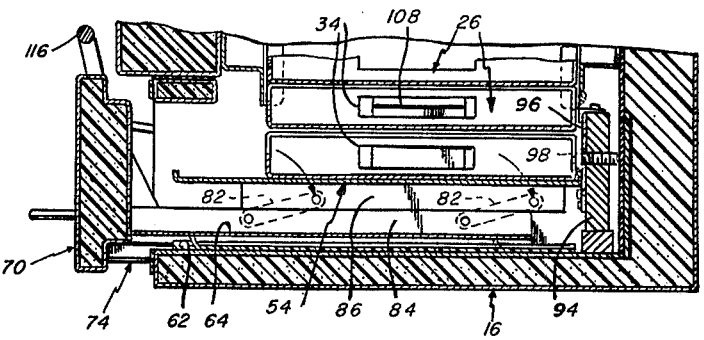
FIG. 7 is a sectional elevation of the drawer mechanism as seen along the line 7—7 of FIG. 5.

When the drawer 52 is in its open position, the platform 54 will be in its lower, rearward position. The platform 54 is raised from its lowered, rearward position to a more forward and raised position in response to closing of the drawer 52. As shown in FIG. 7, just before the drawer reaches its fully closed position, the rear edge of the platform 54 abuts against a stop 94 which is secured in the rear of the cabinet. The stop has a forwardly facing pad 96 made from a low friction plastic material, such as Teflon. After the rear edge of the platform has been urged into engagement with the pad 96, further rearward advancement of the drawer 52 will cause the platform 54 to rise vertically under the influence of the progressively closing drawer and the parallelogram links 82, to the position shown in FIG. 3. As the platform rises, its rear edge slides upwardly against the pad 96. A set screw 98 preferably is provided between the stop 94 and a fixed surface of the cabinet, such as the rear wall 14, to permit forward-rearward adjustment of the position of the stop 94 and thereby control the precise time at which the platform begins to rise with respect to the position of the drawer 52.

When the drawer is closed and the platform is in its most raised position, the platform supports the entire stack of trays. When the drawer is opened, the entire stack gravitates downwardly with the platform until the supplemental support mechanism 56 engages the next lowermost tray in the stack before the platform 54 has been lowered fully. Thereafter, continued drawer opening and lowering of the platform permits the lowermost tray to be separated from the stack and continued opening of the drawer then withdraws that tray, as suggested in FIG. 8, so that the tray can then be removed from the open drawer. The supplemental support mechanism 56 supports the remaining stacked trays until the drawer is closed at which time the platform 54 is raised to engage the then lowest tray in the stack. In the last increment of drawer closure, the entire stack is raised very slightly which causes the supplemental support mechanism 56 to release, so that all of the trays are then supported by the platform alone.

Figure 5:
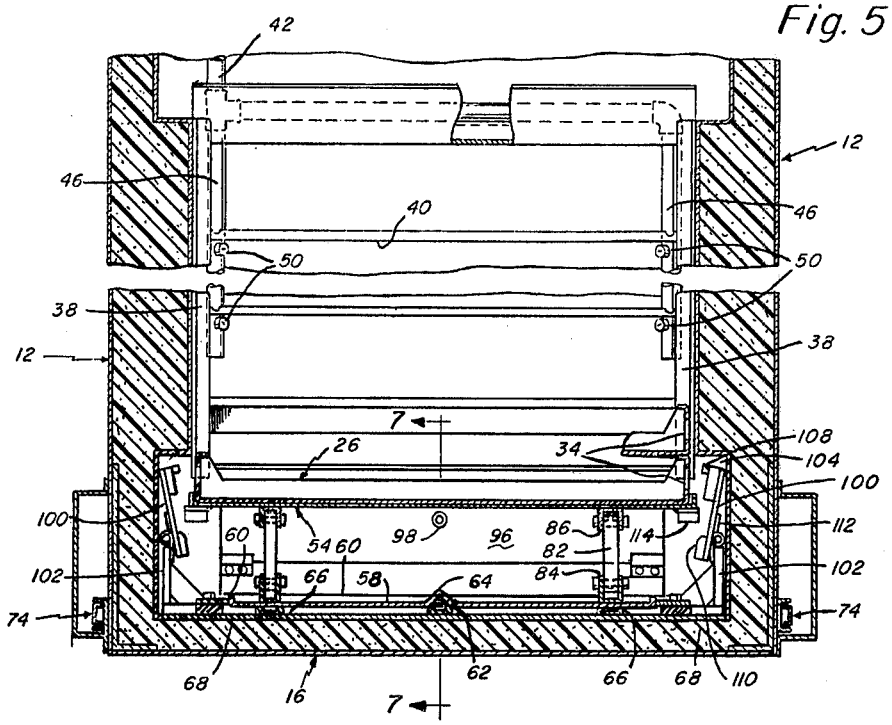
FIG. 5 is a sectional view of the machine as seen along the line 5—5 of FIG. 3 and illustrating the supplemental tray supporting mechanism.
Figure 6:
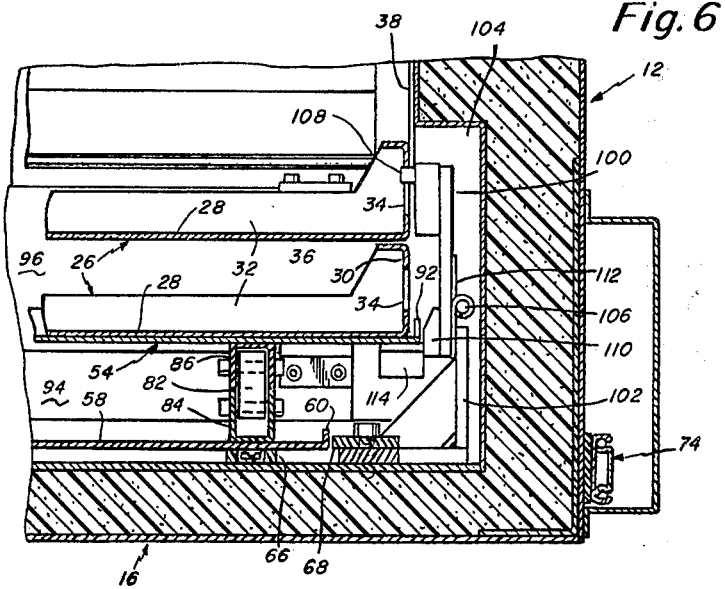
FIG. 6 is an enlarged illustration of the supplemental stack supporting mechanism in its stack-supporting configuration.

The supplemental support mechanism 56 includes a pair of latch plates 100 which are pivotally mounted to a pair of laterally disposed brackets 102. The brackets 102 are secured at the bottom, inner sides of the cabinet. Preferably, the lower portion of each of the cabinet sidewalls 12 is formed to define a cutout region 104 (see FIGS. 5 and 6) to receive the support mechanism 56. Each of the latch plates 100 is mounted for pivotal movement about a forwardly-rearwardly extending pivot 106, disposed between the top and bottom portions of the latch plate 100. The upper edge of the latch plate includes a forwardly-rearwardly extending latching lug 108, which is receivable in a slot 34 in the tray sidewall, and, at its lower end, the latch plates 100 have cam members 110. As shown in FIG. 5, when the front drawer is closed and the stack of trays is supported by the platform 54, the latch plates 100 are biased, by a spring 112, so that the upper end of each latch plate 100 and the latch lug 108 is spaced from the sidewalls 30 of the trays 26. The lower portion of the latch plate 100, including cam member 110, is disposed somewhat inwardly so that it will interfere with downward movement of a cam actuator 114 which is secured to the underside and side edges of the platform 54. The cam actuator 114, latch plate 100, latch lug 108 and cam member 110 are arranged so that when the drawer is opened and the platform 54 is lowered, the cam actuator 114 will engage the cam member 110 to pivot the latch plate 100 and latch lug 108 inwardly toward the sides of the trays 26. The parts are dimensioned so that the latch lug 108 will engage the slot 34 in the next to lowermost tray in the stack, thus permitting the lowermost tray to continue to move downwardly with the platform 54. The weight of the stack of trays bears downwardly against the lug 108 and is sufficient to hold the latch plate 100 in its stack-supporting position while the drawer is opened and the tray removed. When the drawer is reclosed, the platform 54 will be raised into engagement with the lowest tray in the stack and then will raise the stack very slightly to release the force on the lug 108 and permit the spring 112 to urge the latch plate 100 back to the position shown in FIG. 5, in readiness for the next cycle of operation.

The drawer 52 is movable with relative ease between its most open position and the rearward position shown in FIG. 7 in which the platform has been urged into abuttment with the stop 94. In order to fully close the drawer 52 from its FIG. 7 position and to raise the stack of trays, the device includes a leverage and latching system shown in FIGS. 8 and 9. The system includes a transversely extending handle 116, connected to side bars 118 to the sides of the drawer plate 58 at pivots 120. A pair of latching bails 122 are pivoted, at 124, to the side bars 118. Each of the bails 122 has a rearwardly extending end which terminates in a hook 126. The hook 126 cooperates with and engages a transversely extending pin 128 which is secured to a bracket 130 attached to the outside of each of the cabinet sidewalls 12. When the drawer 52 is in its open position and the handle 116 in its proper, raised position (FIG. 8), the hook 126 of the bail 122 will be disposed at a level such that when the drawer is pushed into the position shown in FIG. 7, the hook 126 will be able to pass beneath the pin 128, in readiness to be raised and hooked into engagement with the pin 128 in response to downward locking movement of the handle 116 (to the position shown in FIG. 9). As the handle is rotated forwardly and downwardly, to draw the bail with it, the bail is caused to rise slightly by a roller 132 which is carried by the forward portion 78 of the drawer slides 74. The roller 132 is mounted, by a bracket 134 and is spring biased upwardly. Thus, as the handle 116 is rotated, the hook 126 will advance forwardly and upwardly into engagement with the pin 128. Once the hook 126 and pin 128 have become engaged further downward rotation of the handle 116 will cause the drawer to be pushed inwardly to its final position. The length of the side bars 118 provide leverage sufficient to raise the platform and stack of trays as the drawer advances inwardly. The roller 132, which can move downwardly against the biasing force of its spring, rides beneath and past the hook 126 as the drawer closes.

Figure 8:
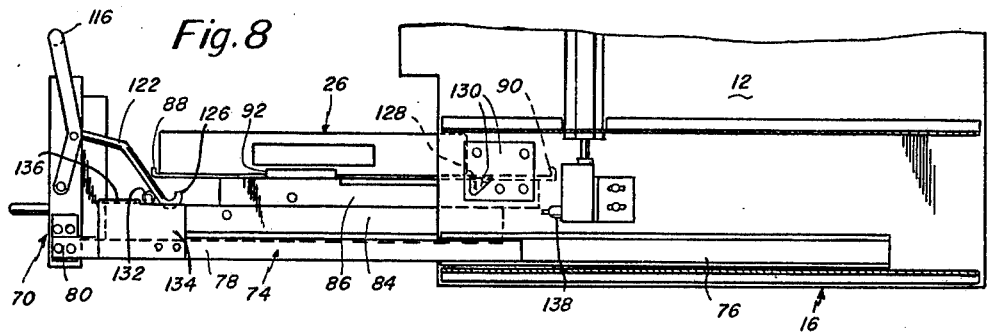
FIG. 8 is a side elevation, partly in section, of the drawer and latching mechanism in an open configuration as seen along the line 8—8 of FIG. 1.

In order for the latching mechanism to operate properly, the handle 116 must be in an initial upright position shown in FIGS. 7 and 8. This required so that the hook 126 will be disposed below the level of the pin 128 to permit the hook to be advanced rearwardly beyond the pin and be in readiness to be raised into engagement with the pin 128. In order to assure that the handle 116 will be in its raised position when the drawer is closed, the mechanism is provided with a ledge 136 which may be an integral part of the bracket 134. The ledge is disposed forwardly of the roller 132 and at a level such that if the handle 116 is not in its upper position, the hook 126 end of the bail 122 will rest on the ledge 136 and at a level which will interfere with the pin 128 and preclude the hook 126 from advancing beyond the pin 128. In that configuration, the hook 126 would not be in a position to be raised into engagement with the pin 128. In order to close and latch the drawer, it is then necessary to push the handle 116 to the position shown in FIGS. 7 and 8. This will cause the drawer to open slightly until the roller 132 is drawn forwardly beyond the hook as suggested in FIG. 8. When the hook end of the bail 122 has been located rearwardly of the roller 132, the hook will then have been lowered to a position at which it can clear the pin 126. The drawer then is simply pushed rearwardly, by the handle 116, to the position shown in FIG. 7 and the handle then is rotated downwardly which fully closes and latches the drawer. It should be noted that the relative locations of the pivots 120, 124 is such that the relative locations of the pivots 120, 124 is such as to effect a toggle-like action which the drawer is fully closed to secure the drawer in its fully closed position.

Figure 9:
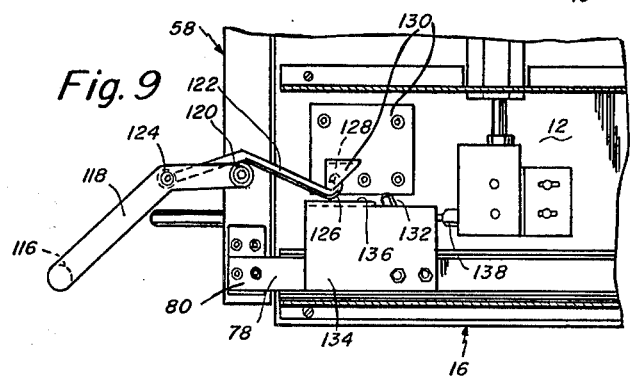
FIG. 9 is an illustration similar to FIG. 8 illustrating the drawer in its closed and locked configuration.

During those intervals when the drawer is opened (or is at least not latched and fully closed) it is preferable to discontinue spraying of cryogenic fluid into the machine as well as to temporarily stop operation of the exhaust blower 37. To this end, a microswitch 138 is mounted to the sidewall 12 of the cabinet at a location which will actuate the switch only when the drawer has been fully closed, as shown in FIG. 9. In the embodiment shown, the microswitch 138 is actuable by the bracket 134 which moves in unison with the drawer. Microswitch 138 is connected to valve 44 as well as to the power circuit for operating the blower to shut the valve 44 and stop operation of the blower when the drawer is in any position other than fully closed and latched. The details of the circuitry by which microswitch 138 controls the valve 44 and blower are not recited herein and are considered to be well within the ordinary skill of the art. The control circuitry may be housed conveniently in a housing 139 mounted on the cabinet top wall.

In summary of the operation of the device, as described thus far, it will be appreciated that the stack of trays advances incrementally, each time the drawer is operated and the lowermost tray is removed. As shown, the flow across any tray in the stack is guided by that tray and the underside of the next uppermost tray. The flow is then redirected upwardly and in a reversed direction by the deflectors 40 to flow through the passage over the next uppermost tray. The serpentine, upward flow is continued in the direction shown by the arrows. The trays are arranged so that the bottom wall of each tray in the stack is in generally alternating alignment with the deflectors. The cryogenic emitting nozzles direct their spray in a slightly downward oriented angle and in a fanned configuration both to assist the propagation of coolant flow and to direct the coolant intimately toward as many surfaces of the articles as possible. When the stack is advanced downwardly one tray increments, each tray is then presented to coolant flow in a reversed direction in relation to the tray. Thus, although the path of the coolant flow does not change, the incremental advancing of the tray produces a reversed flow effect in relation to the articles in the tray.

Figure 10:
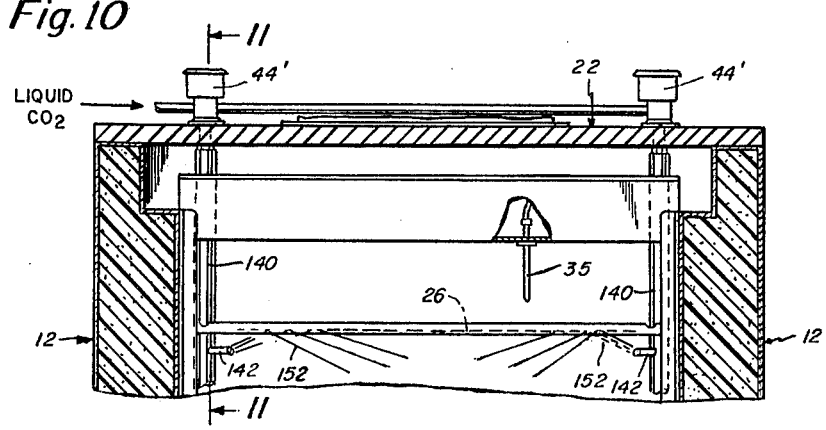
FIG. 10 is a front elevation, partly in section, of a protion of the cryogenic dispersing system for use particularly with liquid carbon dioxide.

There may be instances in which the machine will not be continuously operated and where there may be a number of stacked trays still in the machine. In order to prevent waste of coolant after the articles have been sufficiently frozen, the machine includes thermostatic controls, including a temperature sensor 35 (see FIG. 10) to shut off the flow of cryogenic fluid and operation of the blower 37 in such event. This is in addition to the automatic shutoff of the solenoid valves 44 and blower operation by the microswitch 138 when the drawer is opened. The motor for the blower 37 also may be provided with an appropriate thermostatic control 41 (FIG. 3) to control its operation in response to the temperature of the coolant just prior to its exhaustion to the atmosphere, even while the coolant continues to flow. This assists in maintaining a uniform freezing temperature throughout the system.

It should be noted that the foregoing description of the invention has been in relation to a system utilizing liquid nitrogen as the cryogenic coolant. In some instances, however, it may be desirable to use liquid carbon dioxide. That presents some difficulties particularly in regard to the configuration of the spray pipes and spray nozzles. It has been found that a simple elongate pipe having a plurality of spray nozzles attached to the pipe at spaced locations sometimes results in the lower portions of the spray pipe and lower nozzles becoming blocked with solid carbon dioxide, thus rendering the lower nozzles inoperable. This results from the fact that in the system thus described, as soon as liquid carbon dioxide passes from the solenoid valve into the enlarged distribution piping, the resulting pressure drop and attendant expansion will cause the liquid $CO_2$ to change phase, some of it transforming into gas and some into solid particles. The solid carbon dioxide will tend to collect at the bottom of the closed spray pipe. The build up of solid carbon dioxide in the spray pipe will, in a relatively short time, block the outlet nozzles.

FIGS. 10-14 illustrate an improved distribution system for spraying carbon dioxide at a plurality of spaced locations and in a manner which insures that the nozzles will not become blocked. As shown in more detail in FIG. 11, the carbon dioxide spray pipe configuration includes an elongate, enlarged outer pipe 140 which is closed at its bottom end. The outer pipe houses a plurality of small diameter distribution tubes 142. The distribution tubes 142 are arranged in a bundle extending from the upper end of the outer tube 140 and downwardly through the outer tube. The distribution tubes 142 extend through holes 144 formed at spaced locations in the outer tube 140 and the carbon dioxide is emitted directly from the ends of the distribution tubes. The holes 144 are sealed as by solder or the like. The upper end of the bundle of distribution tubes 140 is encased within a mass of silicone rubber 146 which fills an upper portion of the outer tube 140. The upper ends of the distribution tubes 142 pass through a nut 148 and are soldered together and to a ferrule 150 which is received in the hollow of the nut 148. As shown, a portion of the nut extends into the upper end of the outer pipe 140 and is held in place by the silicone mass 146.

The ends of the distribution tubes 142 which project from the outer tube 140, preferably extend at right angles to the outer tube 140. Also, as shown in FIG. 14, the outer end of each of the distribution tubes 140 is cut at an angle A to the vertical, for example, 30°, so that the direction of emission will be directed at an upward angle for reasons described below.

The distribution tubes 142 may be made of copper and are of relatively small diameter and, for example, each may be of the order of 0.040 inside diameter. As can be seen from FIG. 12, the total cross sectional flow area presented by the distribution tubes 142 is relatively small and, in fact, is smaller than the outlet of the solenoid valve 44 which controls admission of liquid carbon dioxide into the distribution tubes 142. Thus, when the liquid carbon dioxide flows from the solenoid valve 44, it will not expand and will remain in liquid form throughout substantially the full length of each of the individual distribution tubes 142. There will be no significant expansion or pressure drop along the length of each of the distribution tubes 142 until just near the very tip of the tube, at the outlet. The pressure drop there will be sufficient to cause the liquid carbon dioxide to change phase to a mixture of carbon dioxide gas and ice which sprays out of the outlet ends of each of the tubes 142. When the solenoid valve is closed to temporarily terminate flow of liquid carbon dioxide, the pressure downstream of the solenoid valve, in the tubes, will drop and the liquid carbon dioxide will change phase to a mixture of gas and solid carbon dioxide. However, upon reopening of the solenoid valve, the pressure of the liquid carbon dioxide (e.g., of the order of 300 p.s.i.) will force and extrude the narrow stream of solid carbon dioxide particles out of the distribution tubes and the system will then continue to operate as described above, with the carbon dioxide remaining in liquid form until it just reaches the outlet end of the nozzle. It is important that the inner diameter of the distribution tubes 142 be relatively small, smooth and free of any sharp radius bends or kinks in order to permit any solid carbon dioxide which may form to be forced out of the distribution pipe. It also is important that the crosssectional diameter of the distribution tubes 142 remain substantially constant along the length of each of the tubes so that there are no significant pressure drops which might cause expansion and formation of solid carbon dioxide.

In contrast to the liquid nitrogen system previously described, in which there is only a single solenoid valve 44 to admit or shut off liquid nitrogen, each of the carbon dioxide distribution pipes 140 has a separate solenoid valve 44 at its inlet end. The solenoid valves 44 are connected, by suitable fittings, to the nut 148 at the upper end of each of the distribution pipe assemblies.

Preferably, the carbon dioxide is maintained in its liquid form under high pressure which may be of the order of 300 p.s.i. The velocity of the jet of mixed gaseous solid carbon dioxide which is emitted from the outlet ends of each of the distribution tubes 142 is relatively high. In order to reduce the velocity and spread out the stream of cryogenic carbon dioxide, the nozzle outlet end is beveled (FIG. 14) to direct the stream 152 slightly upwardly so that it will initially impinge against the underside of a tray 26 and then be deflected downwardly toward the materials in the next lowermost tray (see FIG. 10). This assures good distribution of the carbon dioxide. It may be noted that to the extent that the emitted carbon dioxide is in solid (fine and particulate) form, those particles of solid carbon dioxide will change into the gaseous phase as they reach atmospheric pressure shortly after they have been emitted. Thus, in large part, the emitted stream is almost completely in gaseous form by the time it reaches the articles in the tray associated with that outlet.

While the invention has been described thusfar in connection with the rapid freezing of articles, it may be adapted for use in heating of articles such as food. For example, frozen or refrigerated food articles may be heated and cooked to proper serving temperature in a device of the type described in which heaters are employed instead of jets for emitting a cryogenic fluid. In some instances, the system may be used as an oven to bake, for example, pizza, bread, pastries or the like.

Figure 15:
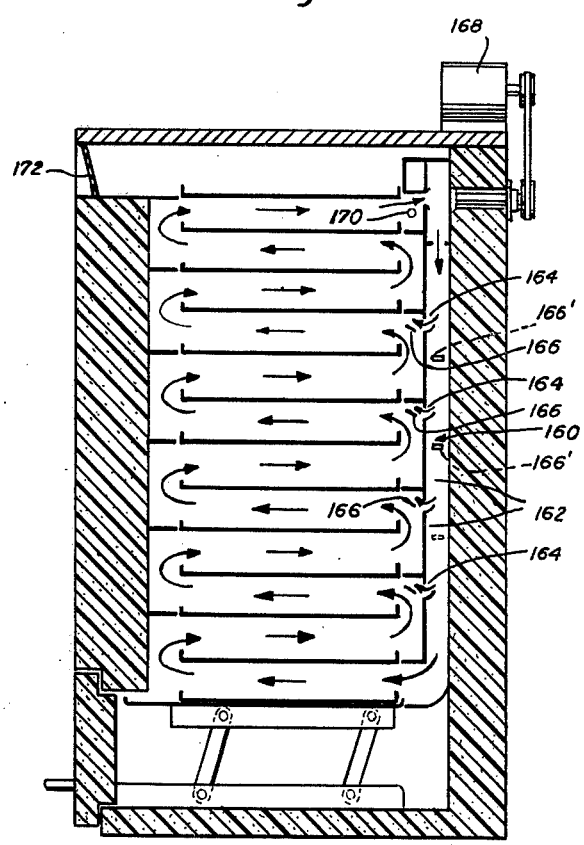
FIG. 15 is a somewhat diagrammatic illustration of a variation of the invention used for heating articles.

FIG. 15 illustrates, somewhat diagrammatically, a device of the type described modified for use as a heater or an oven. The walls of the cabinet and drawer mechanism remain substantially the same except that it may be desirable to utilize a different type of heat resistant insulative material in the core of the walls for the cabinet. In this embodiment of the invention, a distribution chamber 160 is formed in the rear of the cabinet, between the cabinet rear wall and the rear deflectors. An intermediate wall 162 is disposed between the rear deflectors and the distribution chamber 160 and a number of openings 164 are formed in the rear walls. The heaters 166 are disposed just in front of the openings and extend across the width of the openings. Alternatively, it may be desirable in some instances to locate heaters or heating elements directly in the distribution chamber 160, as suggested in phantom at 160'. A centrifugal blower 168 is mounted in the top rear corner of the cabinet and circulates the air through the distribution chamber 160 and through the opening 164 to assist flow in the zigzag path illustrated by the arrows. The air is progressively recirculated as illustrated by the arrows. A thermostatically controlled sensor 170 may be disposed in the uppermost tier, near the end of the zigzag path and just before the centrifugal blower to control operation of the heating elements 166. Preferably, the tray inlet opening at the top front of the device is provided with a flexible curtain 172 which is heat resistant and normally will hang down over the opening to cover the opening and minimize the escape of hot air. The curtain 172 is flexible to permit a tray to be inserted into the opening and then to return to its closed configuration.

It should be understood that the foregoing description of the invention is intended merely to be illustrative thereof and that other embodiments and modifications may be apparent to those skilled in the art without departing from its spirit.

Having thus described the invention, what I desire to claim and secure by Letters Patent is:

1. An apparatus for quick freezing of articles by exposing them to a cryogenic carbon dioxide comprising:
   means defining a column having an inlet at one end and an outlet at the other end, the column being receptive to a plurality of trays disposed in a heightwise stack within the column, said trays being receptive to said articles;
   said trays being further constructed to define flow spaces between each adjacent pair of trays;
   means for spraying cryogenic carbon dioxide into at least some of the spaces between adjacent trays, said means including an elongate outer tube; a plurality of small diameter tubes extending within the outer tube, each of the small diameter tubes having an outlet end which protrudes through the outer tube, each of the outlet ends being disposed in spaced relation along the outer tube; the inlet ends of each of the smaller tubes being attached to a fitting located at the other end of the outer tube; a control valve connected to the fitting, the control valve having an outlet diameter which is no smaller than the aggregate cross-sectional flow area of the inner tube thereby to preclude expansion of liquid carbon dioxide as said liquid carbon dioxide flows from the outlet of the control valve to the inlets of the inner tube; each of the outlet ends of the small diameter tubes being constructed and arranged to direct a jet of cryogenic carbon dioxide into the flow space and at an angle which will initially impinge on the underside of the more upper of the adjacent trays and thereafter be deflected downwardly;
   a source of liquid carbon dioxide in communication with the control valve.

2. An apparatus as defined in claim 1 further comprising:
   the outlet ends of each of the small diameter tubes being cut at an angle to the vertical to effect said upwardly directed stream.

3. A device for distributing cryogenic carbon dioxide at a plurality of spaced locations comprising:
   an elongate outer tube;
   a plurality of small diameter tubes extending within the outer tube, each of the small diameter tubes having an outlet end which protrudes through the outer tube, each of the outlet ends being disposed in spaced relation along the outer tube;
   the inlet ends of each of the smaller tubes being sealingly attached to a fitting located at the other end of the outer tube;
   a control valve connected to the fitting, the control valve having an outlet diameter which is no smaller than the aggregate cross sectional flow area of the inner tubes thereby to preclude expansion of liquid carbon dioxide as said liquid carbon dioxide flows from the outlet of the control valve to the inlets of the inner tubes.

4. A device as defined in claim 3 wherein each of the small diameter tubes is free of any sharp bends.

5. A device as defined in claim 3 wherein the inner diameter of each of the small diameter tubes is of the order of 0.040 inch.

6. A device as defined in claim 3 further comprising:
   a source of liquid carbon dioxide, under pressure, connected to the control valve.

* * * * *